(12) United States Patent
Sigler

(10) Patent No.: US 7,044,267 B2
(45) Date of Patent: May 16, 2006

(54) PORTABLE ADJUSTABLE SLEEP SUPPORT DEVICE

(76) Inventor: Titus S. Sigler, 710 S. Magnolia, Palestine, TX (US) 75801

( * ) Notice: Subject to any disclaimer, the term of this patent is extended or adjusted under 35 U.S.C. 154(b) by 0 days.

(21) Appl. No.: 10/873,001

(22) Filed: Jun. 22, 2004

(65) Prior Publication Data

US 2004/0262865 A1    Dec. 30, 2004

Related U.S. Application Data

(60) Provisional application No. 60/482,756, filed on Jun. 26, 2003.

(51) Int. Cl.
*B25H 5/00* (2006.01)

(52) U.S. Cl. .................. 182/15; 182/116; 297/344.18; 297/440.24

(58) Field of Classification Search ................ 182/116, 182/15, 204; 297/4, 195.1, 195.11, 202, 297/440.24, 461, 451.13, 41, 60, 440.1, 344.18; 248/407, 408
See application file for complete search history.

(56) References Cited

U.S. PATENT DOCUMENTS

| 3,531,158 | A | * | 9/1970 | Allen | 297/486 |
|---|---|---|---|---|---|
| 3,929,309 | A | * | 12/1975 | De Vore | 248/118 |
| 4,161,946 | A | | 7/1979 | Zuesse | |
| 4,565,408 | A | | 1/1986 | Palley | |
| 4,565,409 | A | * | 1/1986 | Hollonbeck et al. | 297/411.1 |
| 4,653,808 | A | * | 3/1987 | Opsvik | 297/423.11 |
| 4,727,958 | A | * | 3/1988 | Botello | 182/15 |
| 4,788,969 | A | | 12/1988 | Thompson | |
| 4,834,457 | A | | 5/1989 | Head | |
| 4,867,273 | A | * | 9/1989 | Schaevitz | 182/116 |
| 4,996,978 | A | | 3/1991 | Gingras | |
| 5,148,557 | A | * | 9/1992 | Fridman et al. | 5/86.1 |
| 6,007,156 | A | | 12/1999 | Chang | |
| 6,030,324 | A | * | 2/2000 | McBride | 482/142 |
| 6,062,638 | A | * | 5/2000 | Ferguson | 297/4 |
| 6,702,384 | B1 | * | 3/2004 | Brown | 297/344.18 |
| 6,926,365 | B1 | * | 8/2005 | Bottoms | 297/423.12 |
| 2003/0075384 | A1 | * | 4/2003 | Pickering | 182/116 |
| 2003/0090132 | A1 | * | 5/2003 | Dixon | 297/195.11 |

* cited by examiner

*Primary Examiner*—J Allen Shriver
(74) *Attorney, Agent, or Firm*—Ronald B. Sefrna

(57) ABSTRACT

A support device for supporting the head and/or portion of the upper body of a seated person in a forward leaning semi-reclining position includes a base to be placed on a generally horizontal surface, with support legs and an upright member, an extension tube adjustably positioned parallel to the upright member, and a head or body support connected to the upper end of the extension tube. In an alternative embodiment a pair of wheels is connected to the base and the legs are adapted to be positioned for supporting a piece of luggage, allowing the device to additionally serve as a luggage cart. In an improvement to a conventional luggage cart, an adjustable head support is added to the frame of the luggage cart so the cart may be used as a support device for a seated person.

11 Claims, 11 Drawing Sheets

PORTABLE ADJUSTABLE SLEEP SUPPORT DEVICE

RELATED APPLICATION INFORMATION

This application claims the benefits of U.S. Provisional Patent Application Ser. No. 60/482,756, filed Jun. 26, 2003, titled "Portable Adjustable Sleep Support Device".

FIELD OF THE INVENTION

The present invention generally relates to devices for supporting the head and/or torso of a person for sleeping, and in its preferred embodiments more specifically relates to a portable, adjustable device for supporting the head or head and torso of a person seated in an upright position to facilitate resting or sleeping.

BACKGROUND OF THE INVENTION

Many people have difficulty sitting comfortably in an unsupported upright position for long periods of time, and many people have difficulty resting or sleeping in an upright position during, e.g., long trips in airplanes and other public or private conveyances. The space allocated for each person in such vehicles is limited and a seated passenger is constrained to a limited range of positions. Although seats may be reasonably comfortable for short period of time, over longer periods of time they can become very uncomfortable and passengers often arrive at their destinations very stiff, sore, and tired. Various approaches have been used in an effort to address this problem and provide an increased level of comfort, but devices known in the prior art have not proven to be fully effective in addressing the need.

In one approach, a device for supporting the head of a user has a padded rest on a frame that is hung around the user's neck and supported by the neck and upper torso. Although this design allows the user to rest his or her head, the weight of the head is simply transferred to another part of the body and can result in strain on the neck.

In another approach, a device with members to fit under the user's arms for supporting the upper body, in the manner of a pair of crutches, has been suggested. Various ways of providing support for the underarm members have been disclosed. This design can achieve the primary purpose of providing some relief to the back of the user, but requires the user's upper body weight to be supported solely by a small area under the arms. The force imposed under the arms can impede circulation and become very uncomfortable in a short period of time. Most examples of this design approach provide no support for the head.

Another approach discloses a seat structure in which a user fastens himself or herself into a vest-like arrangement to support the body. The seat apparatus would necessarily be fixed in position in the vehicle, for use by each passenger who uses the seat, whether a particular passenger needed the support or not.

There remains a need for a device to support the head of a seated user, that is easily portable, easily positioned for use, compact, and easily adjusted. There is also a need for such a support device to support a user in a comfortable forward leaning position.

SUMMARY OF THE INVENTION

The present invention provides a device for supporting the head and/or a portion of the upper body of a seated user in a forward leaning position. The device of the invention allows a user to assume, as nearly as possible in a generally upright seat, a forward resting posture approaching a horizontal, face down position. In its preferred embodiments the device of the invention includes a base that may be placed upon the legs of a seated user, upon a seat beneath the legs of a seated user, or on the floor immediately in front of a seated user. A support pad assembly is disposed above the base and positioned so that a user may lean forward and place his or her forehead or the side or his or her head against the support pad to support the head in a restful position. The base is preferably configured in an inverted "T" shape, and the support pad assembly preferably includes an extension tube that telescopes relative to the upright member of the base, for adjustability.

In an alternative embodiment, the device of the invention is provided with legs that pivot on an axis parallel to the axis of the upright member, and wheels are provided in the base structure, so that the device can be used as a light duty luggage carrier.

In a further alternative embodiment, an improvement to a conventional type luggage carrier is provided by the addition of a support pad assembly, so that the luggage carrier structure can be positioned in front of a seated user to function as the base of the support device, and the user's head rested on the support pad.

The structure and features of the preferred and alternative embodiments of the support device of the invention will be described in detail with reference to the accompanying drawing figures.

DESCRIPTION OF THE INVENTION

Figure 1:
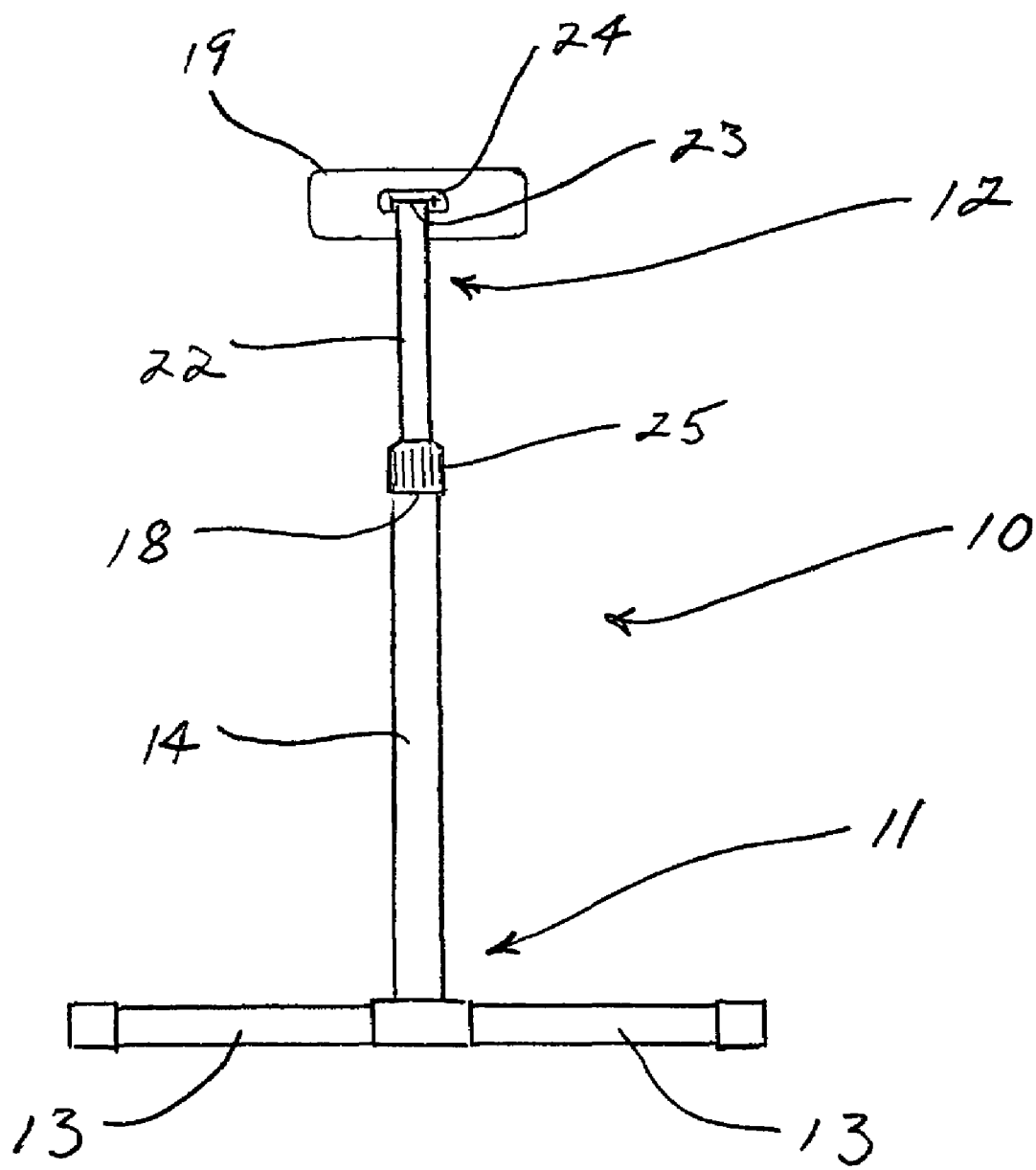
FIG. 1 is a front elevation view of a preferred embodiment of the device of the invention.

Referring to the drawing figures, the device, generally identified by reference numeral 10, comprises a base assembly 11 for supporting the device upon the legs of a user or, in alternative embodiments, upon a seat or the floor, and a support pad assembly 12 for supporting the head or head and upper body of a user, adjustably connected to the base assembly.

In the embodiment illustrated in FIG. 1, the base 11 includes a pair of legs 13, extending in opposed parallel relation and outwardly from upright support member 14, to which legs 13 are connected. It is preferred that legs 13 and upright support member 14 be formed of tubular material, to reduce the weight of the device and facilitate portability. In a variation illustrated in FIG. 2, legs 13 may be formed as generally L-shaped members, each having a base portion 15 and an upright portion 16. The transition between the base portion and the upright portion of the legs in this variation is preferably curved. Each leg may be encased in a cushion 17, for comfort and stability when the device is supported upon the legs of a user. In the illustrated embodiment, cushions 17 are tubular, and extend over legs 13, or the base portion of the legs in the variation of FIG. 2. The upper end 18 of upright 14 is open, and the lower end may be either open or closed, as desired. A cushion, similar to cushions 17, may be added to the upright member, if desired, to reduce the chance of injury or damage in the event of an accident.

Support pad assembly 12 includes a head support 19 with a padded upper surface 20 and a lower surface 21, and an elongate extension tube 22 connected at its upper end 23 to the lower surface of the head support. Head support 19 is configured to provide a rest for the forehead of a user, and is sized accordingly to be received against the forehead and provide a comfortable padded support for the head. It is preferred that the connection between the extension tube and the head support be pivotal, using hinge 24, so the position of the head support can be adjusted. Hinge 24 may be a free hinge, or it may be provided with a locking means to fix the angle of the head support relative to the extension tube, if desired. Extension tube 22 is configured and dimensioned to fit within upright member 14 in sliding telescoping relation, with the lower end of the extension tube within the hollow interior of the upright member and the extension tube extending outwardly from the open upper end 18 of that member. A clamp 25 is provided at the upper end of upright member 14 to releaseably lock the extension tube in a fixed position relative to the upright member. Clamps for locking telescoping tubes are well known in the art, and any desired clamp design suitable for achieving the purpose of the clamp may be used within the scope of the invention.

The first embodiment of the invention may be used by placing the base portions 15 of legs 13 laterally across the thighs of a seated user. Clamp 25 is loosened and the extension tube 22 is raised from within the upright member 14 until the head support 19 is at the desired height for resting the user's forehead, and the clamp is again tightened to hold the extension tube in the selected position. The user may then rest his or her head against the head support. Cushions 17 serve the dual purpose of cushioning the user's legs and preventing the base of the device from slipping. When the use of the device is completed, clamp 25 may be loosened and the extension tube pushed fully into the upright member to reduce the length of the device for easier transportation or storage.

Figure 2:
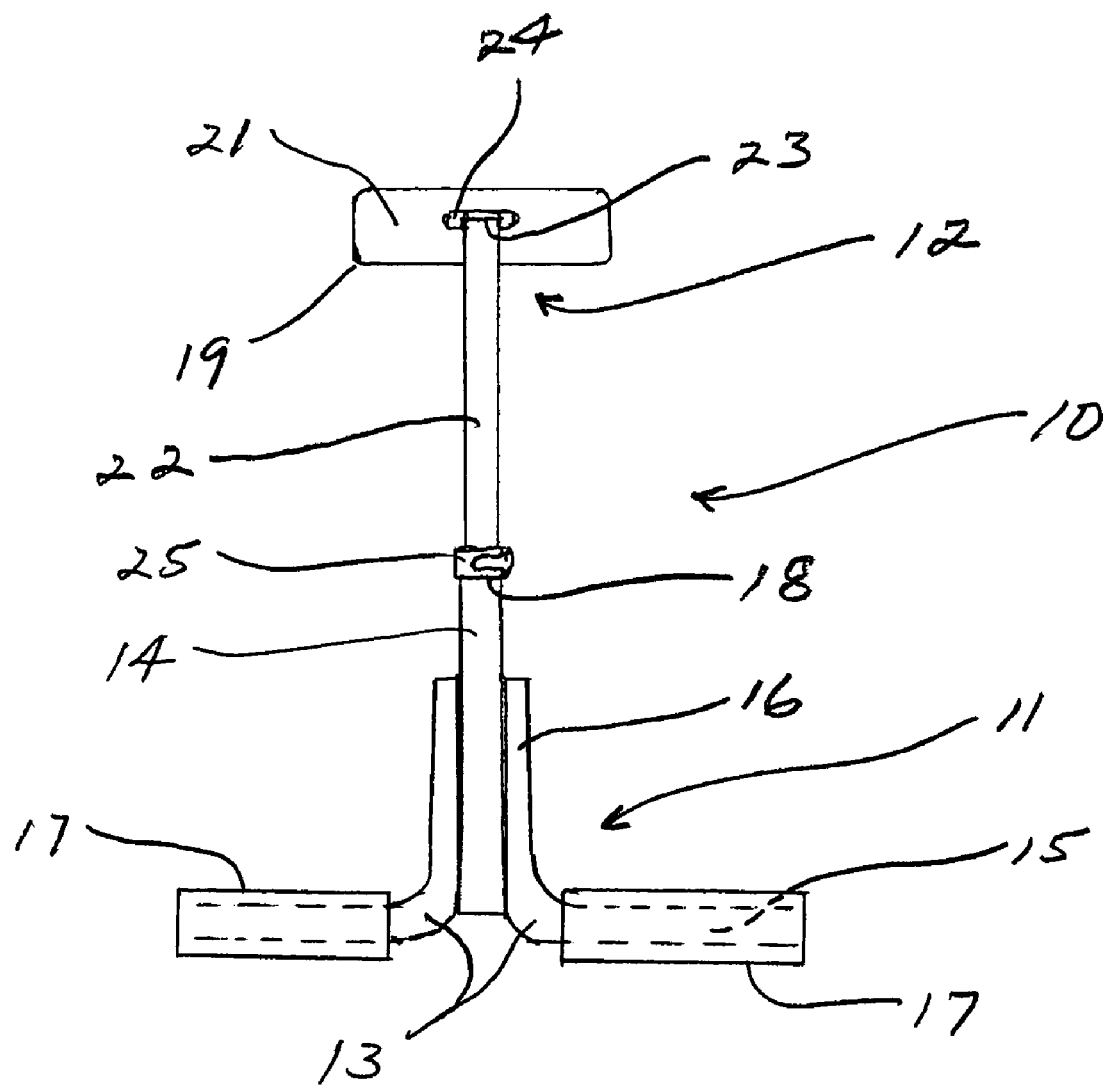
FIG. 2 is a front elevation view of a variation of the base of the preferred embodiment of the device of the invention.
Figure 3:
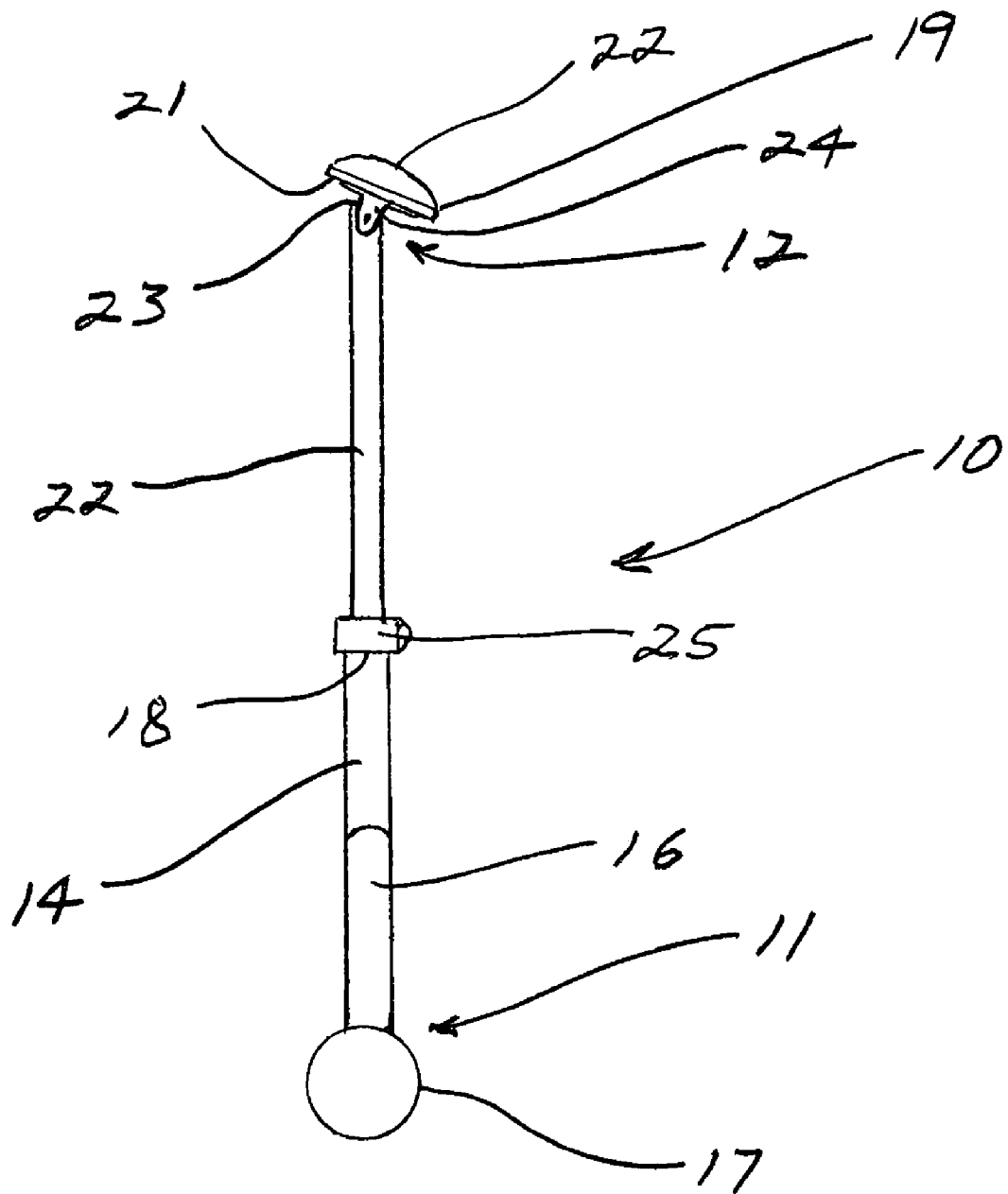
FIG. 3 is a side elevation view of a preferred embodiment of the device of the invention.
Figure 4:
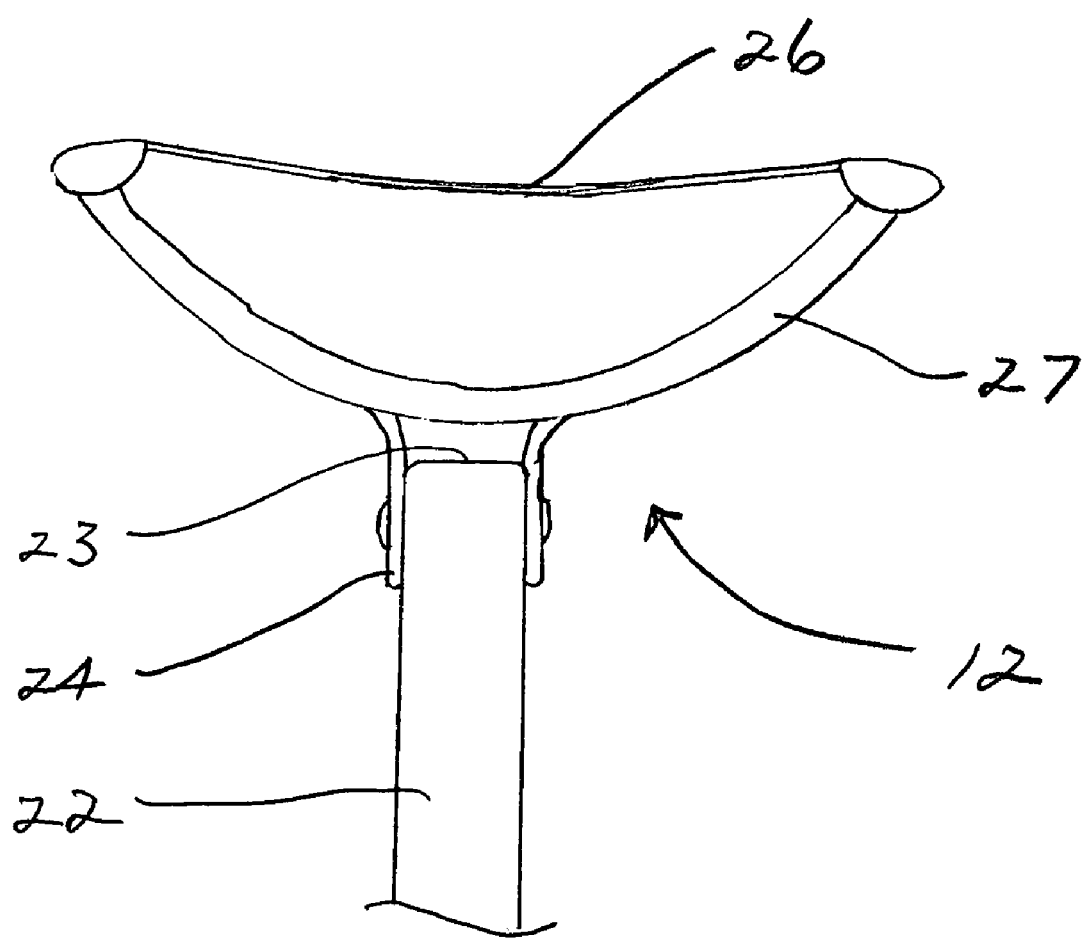
FIG. 4 is a front elevation view of a variation of the head support structure for the device of the invention.

The basic embodiment of the device illustrated in FIGS. 1, 2, and 3 is susceptible to a number of variations and alternative embodiments within the scope of the invention. In one such variation, shown in FIG. 4, head support 19 could comprise a band or strap 26, suspended from a yoke 27 that is connected to the extension tube. Strap 26 could be formed of a mesh material, or penetrated by holes to allow air circulation. The scope of the invention also encompasses a variation in which the extension tube and clamp are omitted and the length of the upright member increased, with the head support 19 connected to the upper end of the upright member. This construction, although within the scope of the invention, is not preferred, because the adjustability of the device is considered to be significant to the comfort of a user.

Figure 5:
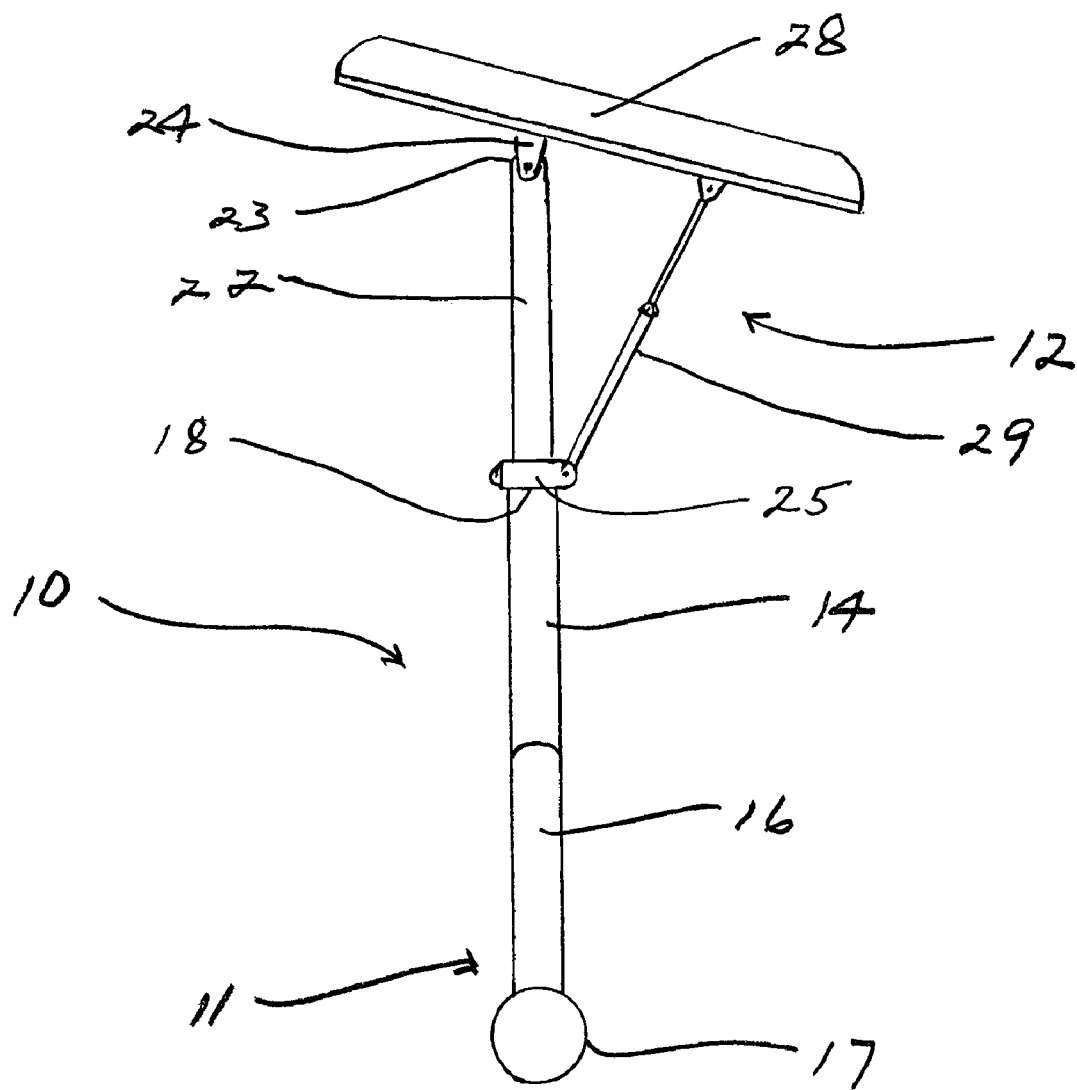
FIG. 5 is a first alternative embodiment of the device of the invention, with a larger structure for supporting the head and body.

In an alternative embodiment, shown in FIG. 5, head support 19 is replaced by an expanded head and upper body support 28, upon which a user could rest a portion of his or her upper body as wall as the side of his or her head. As with head support 19, the head and body support of this alternative embodiment could be constructed as a flat or slightly curved padded board, or could be constructed with webbing suspended upon a frame. The head and a body support is also preferably pivotally connected to the upper end of extension tube 22 so both the height and the angle of the support structure can be adjusted to a comfortable position by the user. If needed, a brace 29 can be provided, extending from a pivotal connection to the lower surface of support 28 to upright member 14. To allow adjustment of the angle of the support, brace 29 can be constructed with two telescoping tubes and a clamp, or with a sliding collar and clamp to move along the upright member.

Figure 6:
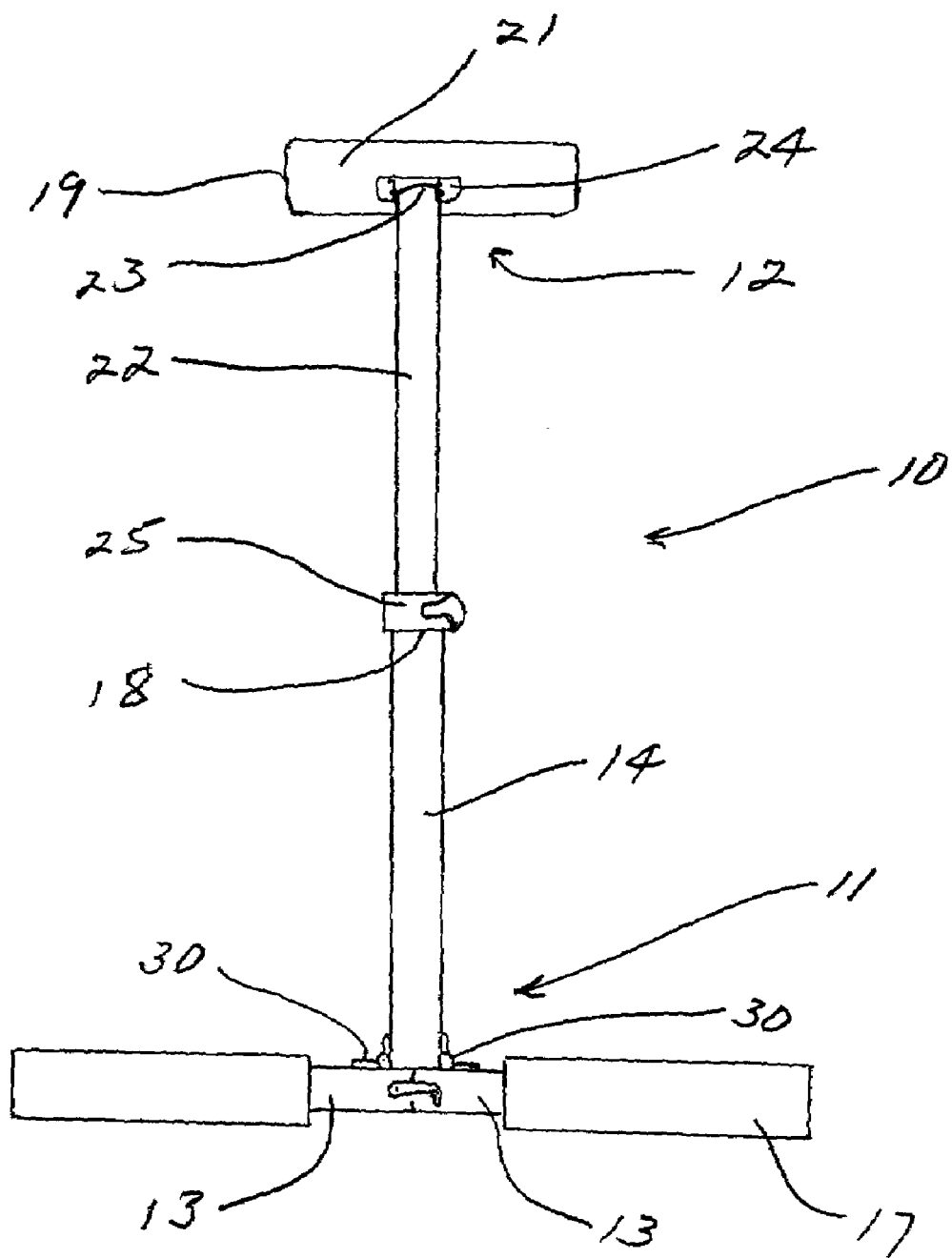
FIG. 6 is a second alternative embodiment of the device of the invention, with hinged legs to facilitate transportation and storage.

In another alternative embodiment, legs 13 are connected to the upright member 14 by hinges 30, as shown in FIG. 6, to allow the base portions of the legs to be folded to lie parallel to the upright portions of the legs and further facilitate transportation and storage of the device when it is not in use. If the leg embodiment of FIG. 2 is used, then hinges 30 may be used to connect base portions 15 to upright portions 16. It is contemplated that the device of the invention will be used by passengers of aircraft and other public conveyances, and the ability to collapse the device of the invention into a compact package is a significant advantage. In one approach to the use of hinged legs, locking hinges are used, so that the base portion of the legs will lock in the extended position, perpendicular to the upright portion of the legs, for use. When the user desires to fold the legs the locking hinge can be released and the base portion of the legs pivoted against the upright portion.

Figure 7:
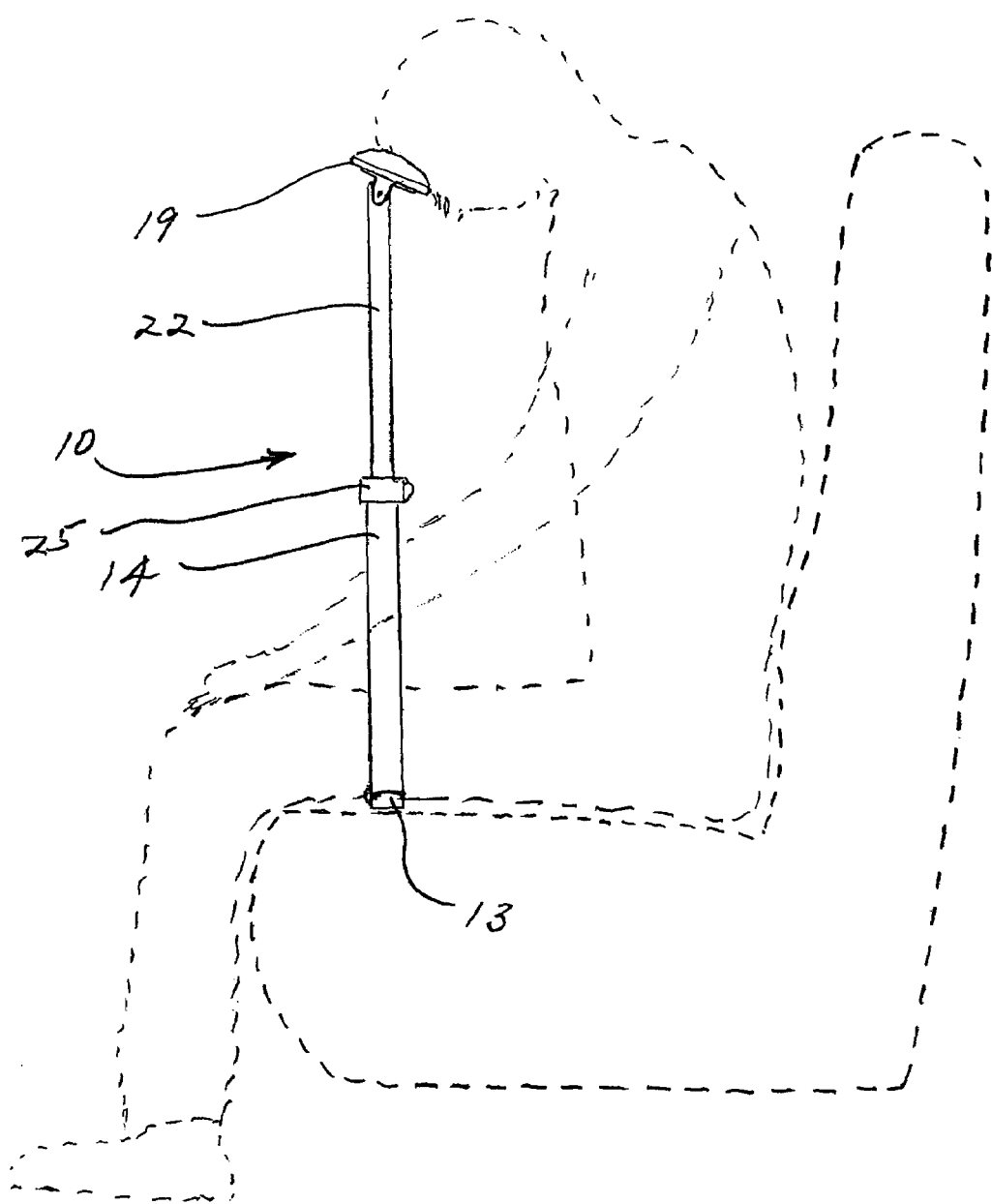
FIG. 7 is a variation of the embodiment of FIG. 5, shown in use (seat and user's legs shown in phantom lines).

The device of the invention may also be used as shown in FIG. 7, by placing legs 13 of the device under a seated person's legs, resting upon and supported by the surface upon which the person is seated. When used in this manner the upright support member of the device extends upward between the legs of the seated person rather than resting upon them, and the weight of the resting person's head and/or upper body is not imposed upon the person's legs. When a hinged leg embodiment is used in this position the use of locking hinges is not required, because the device is secured and stabilized between the seating surface and the user's legs.

Figure 8:
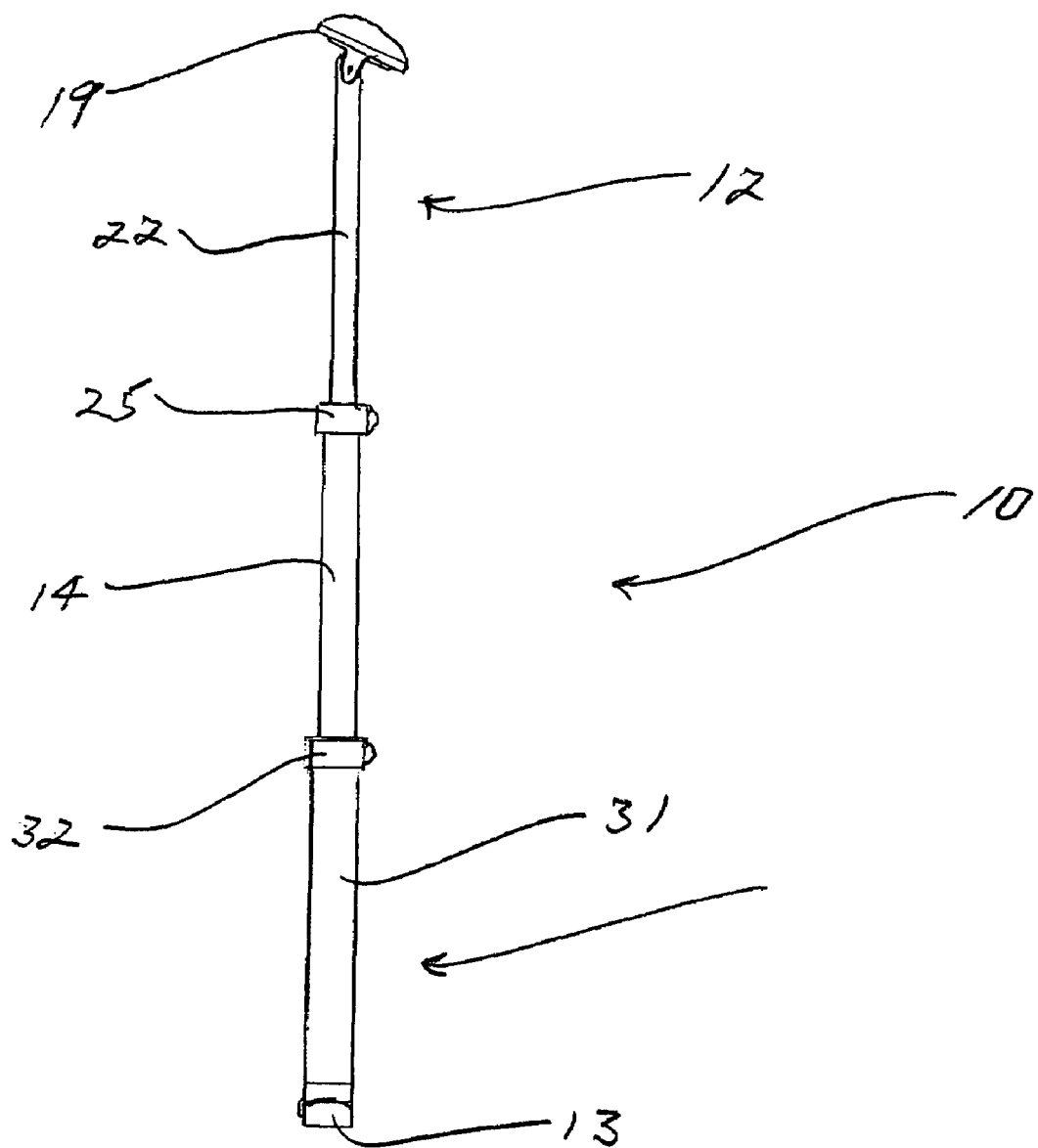
FIG. 8 is a further alternative embodiment of the device of the invention, that may be supported upon a floor.

In a further variation, the device of the invention may be supported upon the floor when in use, rather than by the user's legs or the seat, with the upright components disposed just beyond the forward edge of the seat. The length of upright support member 14 and extension tube 22 may be increased so that the previously described embodiments of the invention may be used in this manner, or an alternative embodiment may be provided, as illustrated in FIG. 8. In this embodiment a second extension tube 31 and a second clamp 32 may be added, with extension tube 22 received in second extension tube 31 in telescoping relation and with second extension tube 31 received in upright member 14 in telescoping relation. The second clamp 32 is disposed at the upper end of extension tube 22, to releaseably lock the second extension tube. The addition of the second extension tube allows the expanded device to span the distance from the floor to the upper body and/or head of a seated user, to support a partially reclining user from the floor. In this embodiment inclusion of the legs, either folding or non-folding, is preferred, for stability, and to allow the device to be supported upon the user's legs or seat. A user may place his or her feet over the legs when the device is in use supported from the floor, to hold the base of the device in place.

Figure 9:
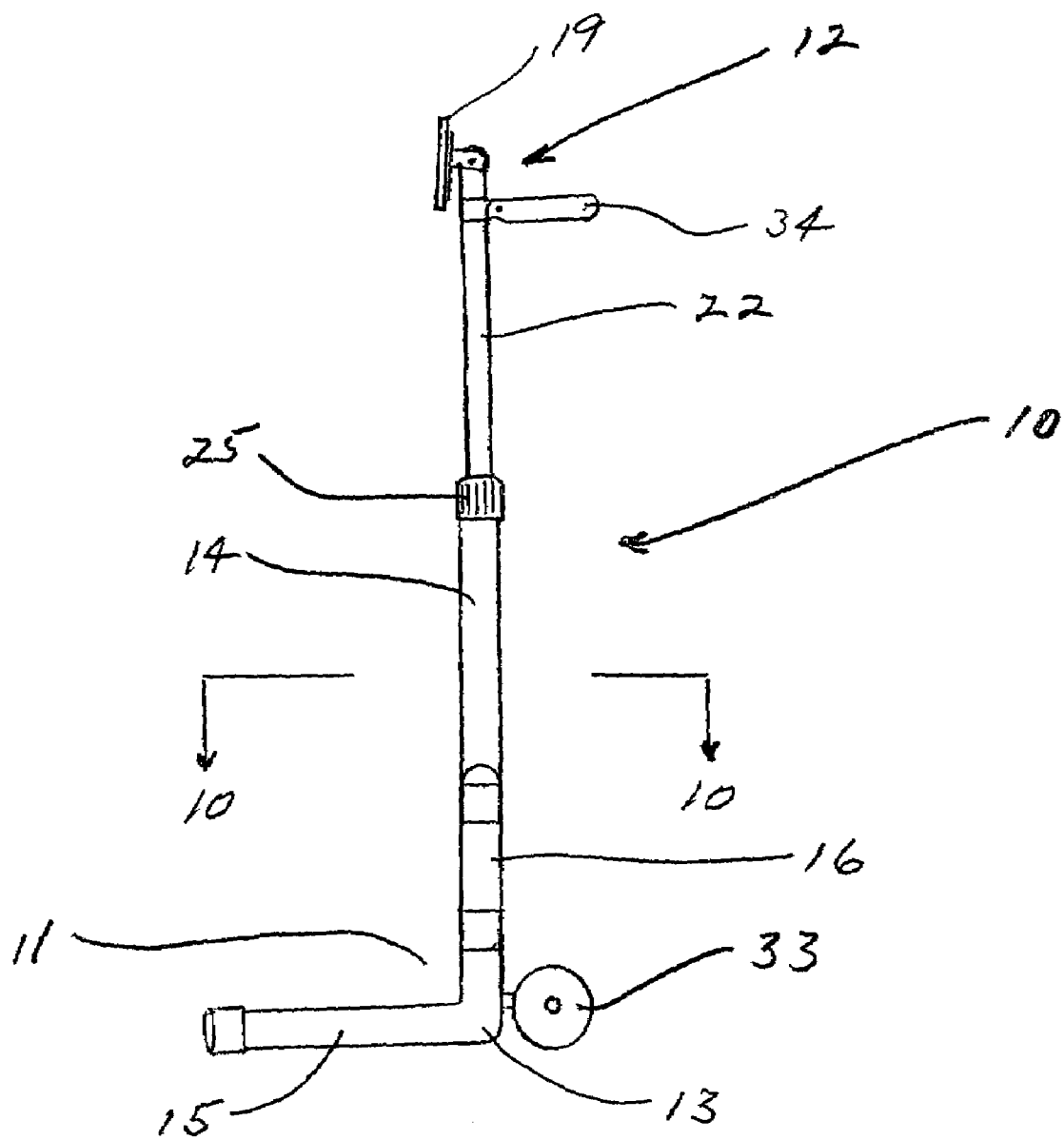
FIG. 9 is a side elevation view of the device of the invention, adapted for a second use as a light-duty luggage cart.
Figure 10:
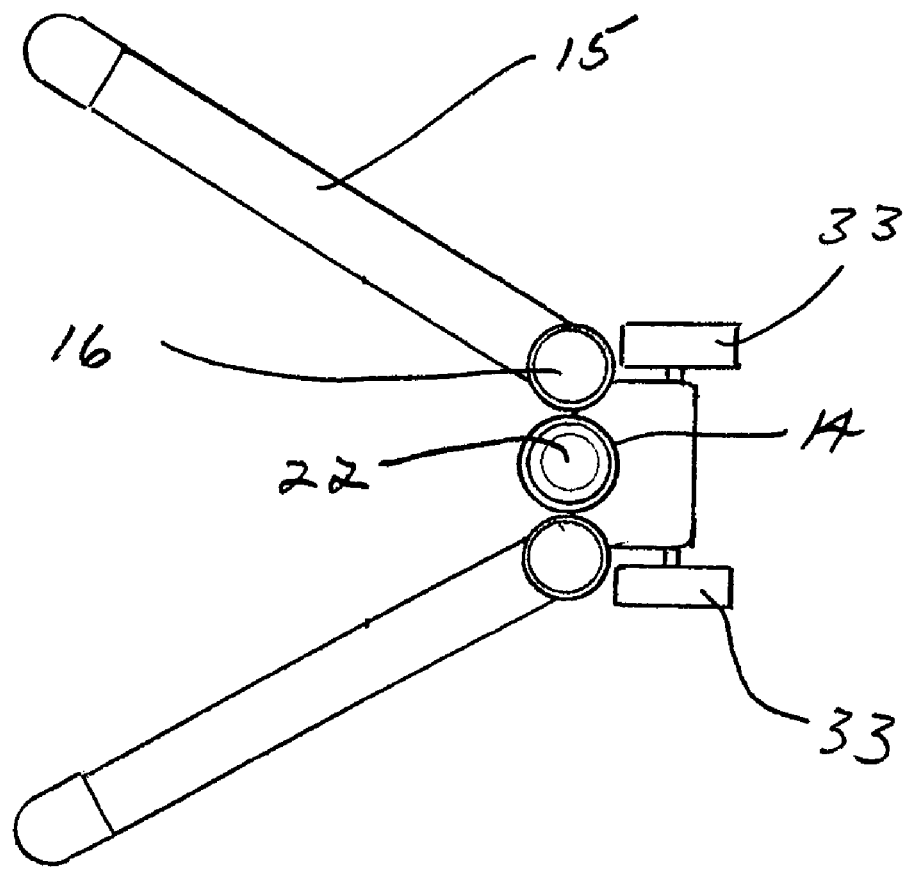
FIG. 10 is a sectioned top plan view of the device as shown in FIG. 8, along line 9—9 of FIG. 8.

The design of the device of the invention can readily be adapted to allow the device to be used as a light-duty luggage cart in addition to use as a sleep or resting support. To make the device convertible into a luggage cart, the base portions of the legs are constructed to allow them to be rotated in the same plane from a directly opposed orientation to a second position with an angular separation of less than ninety degrees, as shown in FIGS. 9 and 10, and frictionally restrained or releasably locked in that orientation. Wheels 33 are added to the base in coaxial relation, preferably disposed such that the wheels are positioned a short distance above the floor when the base portions 15 of legs 13 are in contact with the floor. When the device is tilted toward the wheels with the legs rotated to the luggage carrying configuration, wheels 33 are brought into contact with the floor such that further tilting of the device results in rotation on the axis of the wheels to raise the base portions of the legs from the floor and allow the device to be rolled on the wheels. The distance between the wheels is such that the wheels will not interfere with the use of the device as a support device when the legs are rotated to an opposed parallel orientation. A handle 34 of any convenient design is preferably connected to extension tube 22 near its upper end, below the pivotal connection to, e.g., head support 19, so that the handle can be used to pull, or carry, the device but will not interfere with its use as a sleep or resting support. To use the device as a cart, the base portions of the legs are rotated to the second position and the extension tubes are extended to bring the strap to an appropriate height for grasping and pulling. A briefcase or other relatively light object can be placed on the legs and supported by them when the device is tilted to lift the legs from the floor and pulled to roll on the wheels.

Figure 11:
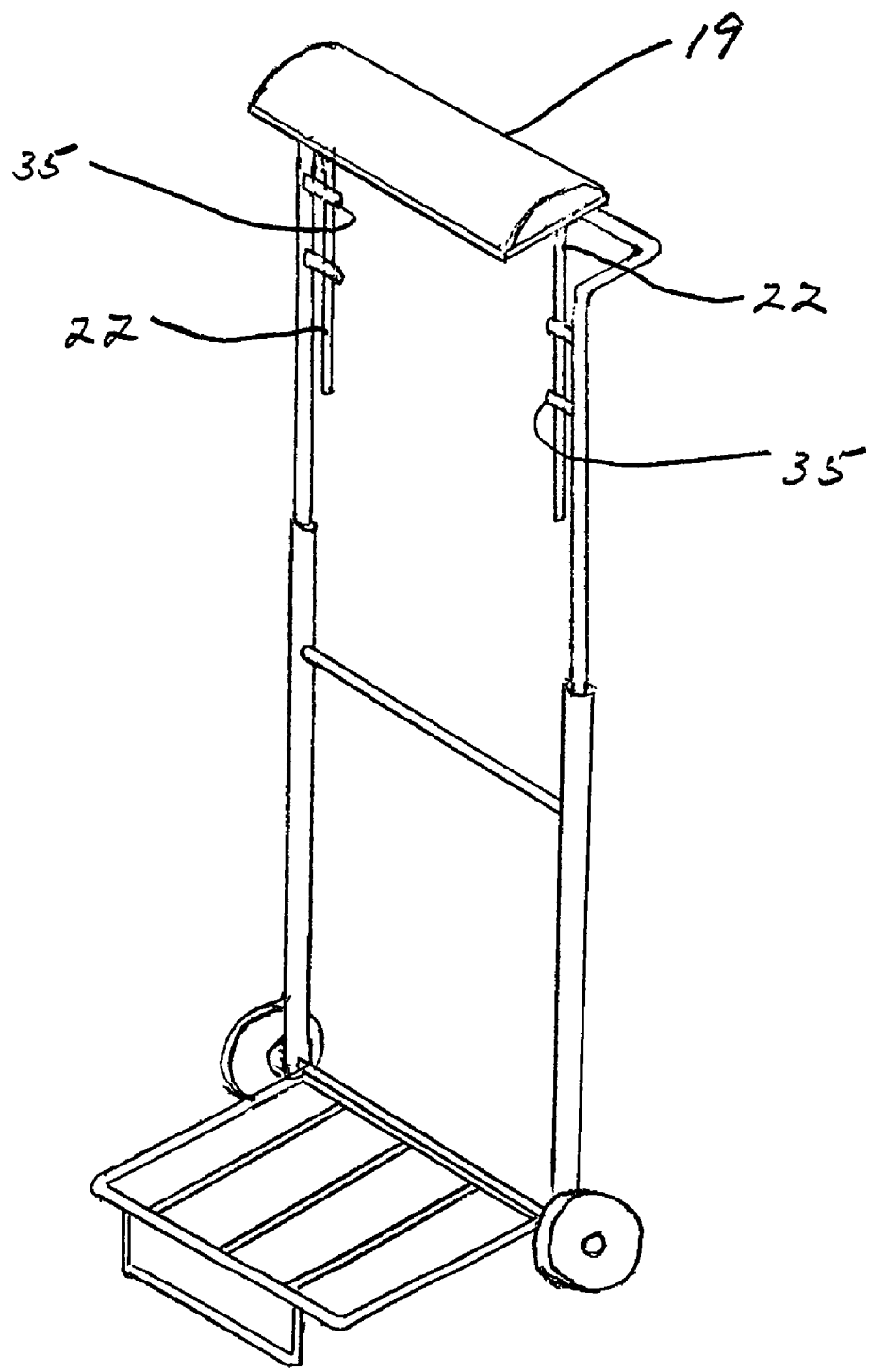
FIG. 11 is a perspective view of an improvement to a conventional luggage cart, showing the addition of a support assembly.

As shown in FIG. 11, the support pad assembly 12 of the device may readily be adapted for addition to a conventional two wheeled luggage cart, in an improvement to allow an otherwise conventional luggage cart to be used as a personal support for resting in a seated position. In the improvement embodiment of FIG. 11, a support 19 is provided with a pair of extension tubes 22, each extending parallel to a respective one of upright handle members of the conventional cart. In the illustrated embodiment extension tubes extend through retainers 35, which may be connected either permanently or removably to the luggage cart handle. The addition of the support pad assembly does not interfere with the conventional use of the luggage cart, but provides a support for a seated person with the cart placed in front of the person. The height of the support pad assembly may be adjusted by adjusting the position of the extension tubes and/or the position of the cart handle.

The foregoing description of the structure and use of the device of the invention, and of certain variations and alternative embodiments, is illustrative of the scope of the invention. The invention is not limited to the particular embodiments described, and is susceptible to further variations and alternatives within the scope thereof, as recited by the following claims.

The invention claimed is:

1. An adjustable support device for supporting a portion of the upper body of a person whose lower body is supported by an independent seating structure upon which the person is seated in a forward leaning semi-reclined resting position, comprising a base independent of the seating structure upon which the person is seated, said base having an upright support member and a pair of legs connected to said upright support member, said base to be placed and supported upon a generally horizontal surface, without connection between said base and the seating structure such that the device may be moved to and away from the seating structure without moving the seating structure, with said upright support member extending upwardly from the horizontal surface and with said legs disposed perpendicular to said upright support member; and a support pad assembly including a straight extension tube with first and second ends, disposed parallel to said upright support member in overlapping sliding relation thereto, locking means for releasably locking the position of said extension tube relative to said upright support member, and a head support connected to said second end of said extension tube to receive and support the head of the seated person leaning forward over the horizontal surface upon which said base is supported.

2. The support device of claim 1, wherein said upright support member comprises an elongate tube with a hollow interior, said extension tube comprises an elongate tube of smaller cross-sectional dimension than said upright support member, and wherein said extension tube is disposed in coaxial telescoping relation with said upright support member with said first end of said extension tube received in said hollow interior of said upright support member.

3. The support device of claim 1, wherein said head support is pivotally connected to said second end of said extension tube.

4. The support device of claim 1, wherein said legs of said base are encased in resilient padding material.

5. The support device of claim 1, wherein said head support comprises a generally planar plate with a lower surface and an upper surface, said lower surface of said head support is connected to said second end of said extension tube, and wherein said head support includes padding material connected to said upper face thereof.

6. The support device of claim 1, wherein each of said legs is connected to said upright support member by hinge means, such that said legs may be disposed in a first position with said legs perpendicular to said upright support member for use of the device, and in a second position with said legs parallel to said upright support member for transportation and storage of the device.

7. The support device of claim 6, wherein said hinge means comprising locking hinges, such that said legs may be releasably locked in said first position.

8. The support device of claim 1, further comprising a body support interconnected to said extension tube adjacent to said second end thereof and extending at an angle relative to said extension tube, to receive and support a portion of the upper body of the seated person leaning forward over said horizontal surface upon which said base is supported.

9. The support device of claim 8, wherein said head support is integral with said body support.

10. The support device of claim 8, further comprising a brace extending between said body support and said upright support member of said base.

11. The support device of claim 10, wherein said base is adjustable in length.

* * * * *